Figure 1:
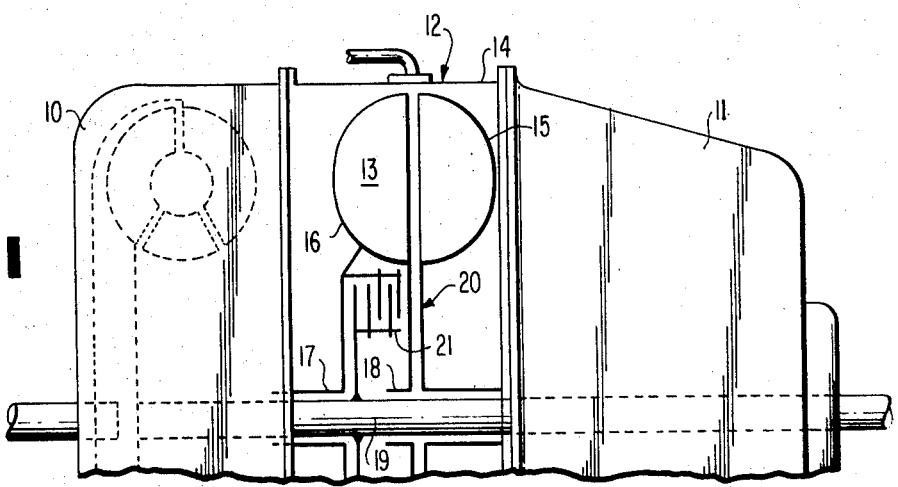

United States Patent [19]

Forster et al.

[11] 3,777,860
[45] Dec. 11, 1973

[54] HYDRODYNAMIC BRAKE FOR VEHICLES ESPECIALLY FOR MOTOR VEHICLES

[75] Inventors: Hans-Joachim M. Forster, Stuttgart; Werner Hensel, Berkheim, both of Germany

[73] Assignee: Daimler-Benz Aktiengesellschaft, Stuttgart-Untertuerkheim, Germany

[22] Filed: May 24, 1971

[21] Appl. No.: 146,053

[30] Foreign Application Priority Data
May 23, 1970 Germany .................. P 20 25 306.9

[52] U.S. Cl. .................. 188/291, 60/341, 192/12 A
[51] Int. Cl. ............................................ F16d 57/02
[58] Field of Search .................. 188/290, 291, 296; 60/54, 341, 345; 192/12 A

[56] References Cited
UNITED STATES PATENTS
3,155,197  11/1964  Lee et al. .................. 188/291 X
3,526,304  9/1970  Pearce et al. .................. 192/12 A X Primary Examiner—George E. A. Halvosa
Attorney—Craig, Antonelli & Hill

[57] ABSTRACT

A hydrodynamic brake for vehicles, especially for motor vehicles, with at least one stationary and one rotating blade wheel, whereby the latter is adapted to be connected with the drive shaft by way of an engageable clutch which is controllable automatically in dependence on the actuation of the vehicle brake.

17 Claims, 2 Drawing Figures

PATENTED DEC 11 1973 3,777,860

INVENTORS
HANS-JOACHIM M. FÖRSTER
WERNER HENSEL

BY Craig, Antonelli & Hill

ATTORNEYS

HYDRODYNAMIC BRAKE FOR VEHICLES ESPECIALLY FOR MOTOR VEHICLES

The present invention relates to a hydrodynamic brake (retarder) for vehicles, especially for motor vehicles, with at least one fixed and one rotating blade wheel, whereby the latter is connected with the drive shaft by way of an engageable and disengageable clutch.

A wear-free continuous brake, for example, when driving over long inclined stretches is imperative for motor vehicles, and above all, for heavy-duty trucks, buses or the like. A hydrodynamic brake is quite suitable for such purpose. The problem of these hydrodynamic brakes, however, is the windage losses, i.e., losses due to ventilation, occurring during idling. These losses, naturally, should be avoided or at least be kept as small as possible.

It is already known for that purpose to use retarders of the aforementioned type. The rotor is thereby disconnected in the normal condition and is clutched to its drive shaft only for the braking itself. The windage or ventilation losses durng idling are therefore eliminated. However, the problem is not solved by such arrangement alone. Rather, the operation of the clutch engagement has to be matched accurately to the brake actuation because otherwise the danger exists of excessive shocks in the drive unit or the clutches have to be constructed excessively large.

The present invention is concerned with the task to provide a solution for this problem. The underlying problems are solved according to the present invention in connection with the brakes of the aforementioned type in that the clutch is controllable automatically in dependence on the actuation of the vehicle brake. One is thereby in a position to control by means of the vehicle brake the clutch engagement of the retarder. One possibility resides in that a continuously filled hydrodynamic work circulatory system known as such, is provided, and the clutch is constructed as a clutch adapted to be actuated by a pressure medium and shiftable under load. The use of lamellae friction clutches actuated by a pressure medium is thereby primarily contemplated.

A hydrodynamic brake may be arranged, naturally, at different places of the drive connection of a motor vehicle. Also the construction of the hydrodynamic brake itself can be realized in any suitable, known manner. For example, a construction thereof as single blade wheel is known. Also the construction in the manner of customary hydrodynamic couplings has already been proposed which may be constructed as single or dual couplings. In the latter case, an inclination of the blades in the forward direction would be particularly advantageous for the transmission capacity. It is desirable as such to be able to control the brake moment. The present invention proposes for such brakes that a conventional working circulation adapted to be filled and emptied be provided and a clutch actuated by a pressure medium to be so coordinated to the working circulation that the clutch engages prior to the filling of the working circulatory system. According to this proposal, the clutch need not be shiftable under load, as such. This means, in that case even form-locking clutches such as, for example, claw clutches could be used. However, to the extent that lamellae friction clutches are used in that connection, the latter can be constructed according to the present invention relatively small and can be arranged on the inside of the hydrodynamic brake.

In particular, the control according to the present invention may be so constructed that a shifting slide valve is operatively connected with the brake pedal either directly or indirectly which, during actuation of the brake, opens up to the pressure medium its passage leading to the clutch, and that a control slide valve in the brake circulation system is adapted to be controlled by the pressure build-up in the clutch. Appropriately, a line is branched off from the line between the shifting slide valve and the clutch leading to an end face of the control slide valve whereby the control slide valve controls with two partial pistons or spools both the inlet as also the outlet of the work circulatory system.

It should also be noted that the time of the disengagement of the clutch during the release of the brake—i.e., prior or subsequent to the emptying of the working circulatory system—does not play as large a role insofar as force-locking clutches are used. However, the possibility exists, of course, to control the clutch, for example, by the interconnection of throttles or other delay elements, in such a manner that it will be disengaged only after the emptying of the working circulatory system. It is assured in this manner that the working circulatory system is centrifuged empty in every case before it comes to a standstill as a result of the unclutching.

The present invention prefers—as already mentioned several times—force-locking friction disk clutches, even though, of course, also cone clutches or form-locking clutches such as, for example, claw clutches could be used. The actuation takes place also in any desired manner, for example, also pneumatically or electrically even though the present invention prefers the hydraulic actuation by reason of the already present working liquid of such a hydrodynamic brake.

Accordingly, it is an object of the present invention to provide a hydrodynamic brake for vehicles, especially motor vehicles, which avoids by simple means the aforementioned shortcomings and drawbacks encountered in the prior art.

Another object of the present invention resides in a hydrodynamic brake for heavy-duty vehicles such as trucks, buses or the like which assures a wear-free continuous brake.

A further object of the present invention resides in a hydrodynamic brake for motor vehicles which minimizes the ventilation or windage losses durng idling yet avoids excessive shocks in the drive unit while at the same time permitting clutches of relatively small design.

Still a further object of the present invention resides in a hydrodynamic brake for motor vehicles in which the clutch is automatically engageable by the actuation of the vehicle brake.

Still another object of the present invention resides in a hydrodynamic brake for motor vehicles which is reliable in operation yet is compact in design.

Figure 2:
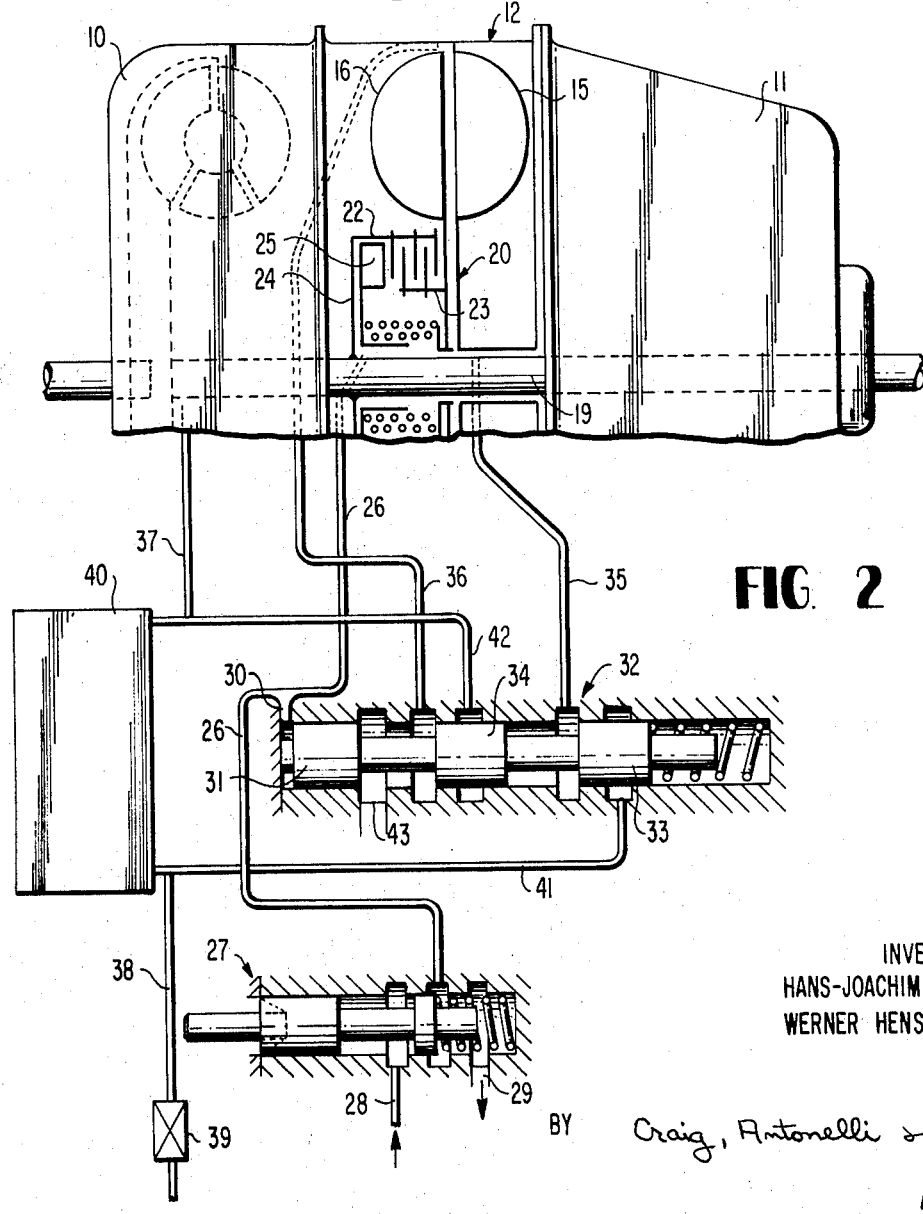

These and further objects, features and advantages of the present invention will become more obvious from the following description when taken in connection with the accompanying drawing which shows, for purposes of illustration only, two embodiments in accordance with the present invention, and wherein:

FIG. 1 is a schematic view of a hydrodynamic brake between the hydrodynamic and mechanical sections of a transmission in accordance with the present invention; and FIG. 2 is a schematic view indicating the shifting diagram of a clutch in a brake according to FIG. 1.

Referring now to the drawing wherein like reference numerals are used throughout the two views to designate like parts, and more particularly to FIG. 1, a hydrodynamic brake generally designated by reference numeral 12 is arranged between the hydrodynamic section 10 and the mechanical section 11 of a transmission. The brake 12 is constructed in the manner of conventional hydrodynamic couplings whereby the blades may be inclined in the forward direction of rotation. The brake 12 includes a working circulation 13 which can be filled and emptied in a conventional manner (not illustrated). A stationary blade wheel 15 is connected with the housing 14 of the hydrodynamic brake or the blades thereof are simply cast integral with the housing. The rotating blade wheel 16 is freely rotatably supported with the hub portions 17 and 18 on the shaft 19 to be braked which connects the hydrodynamic transmission section 10 with the mechanical transmission section 11.

A lamellae friction clutch generally designated by reference numeral 20 of any conventional construction is arranged inside of the working circulation 13, whose outer friction disk or lamellae set is connected with the rotating blade wheel 16 and whose inner lamellae or friction disk set is securely connected by a carrier 21 with the shaft 19. The blade wheel 16 may be clutched therefore to the shaft 19 by means of this clutch 20 and then rotates with the rotational speed of the shaft 19, i.e., with the input rotational speed of the mechanical transmission section 11.

According to FIG. 2, the hydrodynamic brake 12 is arranged and constructed in principle in the same manner and is adapted to be clutched with the drive shaft 19 by means of the clutch generally designated by reference numeral 20. However, the inner lamellae or friction disk carrier 23 is now connected wih the rotating blade wheel 16 and the outer lamellae or friction disk carrier 22 with the shaft 19. The actuating piston 25 of the clutch 20 is arranged in a conventional manner within the cylinder space 24.

The pressure medium supply line 26 to the clutch 20 leads to a shifting slide valve generally designated by reference numeral 27 which is operable to connect the line 26 selectively either with the pressure supply line 28 or with the discharge 29. This shifting slide valve 27 is connected either directly or indirectly with the brake pedal (not shown) by conventional means not illustrated in detail. In case the brake pedal is not actuated, the shifting slide valve 27 is in its left end position as illustrated.

A branch line 30 leads from the line 26 to the end face 31 of a control slide valve generally designated by reference numeral 32 which, with its two partial pistons or spools 33 and 34 controls the line 35 to the hydrodynamic brake 12 as well as the discharge line 36 thereof. The working circulatory system 13 of the hydrodynamic brake 12 is filled from the hydrodynamic torque converter by way of the line 37. A discharge line 38 leads back to the oil sump by way of an excess pressure valve 39.

In the illustrated position, the clutch 20 is disengaged, and the working circulatory system 13 is empty. If the shifting slide valve 27 is now displaced by the brake pedal into its right end position, then the supply line 26 to the cluch 20 is connected with the pressure line 28. The cylinder space 24 is now filled and the clutch is engaged by means of the actuating piston 25. As soon as the engagement has taken place and the rotor 16 of the hydrodynamic brake 12 rotates, the full pressure builds up in the line 26 and acts by way of the line 30 on the end face 31 of the shifting slide valve 32 so that the latter also passes over into its right end position. The supply line 35 to the hydrodynamic brake 12 is now connected by the partial piston 33 with the line 41 coming from the cooler 40. In this manner, the hydrodynamic brake 12 can be filled by way of the line 37, cooler 40, and line 41. Simultaneously, the discharge line 36 of the hydrodynamic brake 12 is connected at the partial piston 34 with the line 42 leading to the cooler 40 so that now a closed circulatory system results.

During the disengagement of the brake, the operation takes place in a reverse sequence, i.e., the pressure line 26 to the clutch 20 is again connected with the discharge 29 at the shifting slide valve 27. In this manner, a pressure decrease occurs approximately simultaneously at the clutch 20 and at the shifting slide valve 32 which then returns again into its left end position and, as a result thereof, again closes off the working circulatory system 13. The working circulatory system 13 then is emptied by way of the discharge line 36 and the discharge 43.

While we have shown and described two embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

What we claim is:

1. A hydrodynamic brake for vehicles with a vehicle brake especially for motor vehicles with a brake pedal for the vehicle brake, with at least one fixed blade wheel means and one rotating blade wheel means, said rotating blade wheel means being connectible with a drive shaft by way of an engageable means, said engageable means being automatically controllable in dependence on the actuation of the vehicle brake, characterized in that a working circulation means adapted to be filled and emptied is provided and in that the engageable means is a clutch actuable by a pressure medium which is so coordinated to the working circulation means that it engages prior to the filling of the working circulation means, in that a shifting slide valve means is operatively connected with the brake pedal, said shifting slide valve means opening up to the pressure medium a path leading to the engageable means upon actuation of the vehicle brake, and in that a control slide valve means in a brake circulation means is controllable by the pressure build-up in the engageable means.

2. A brake according to claim 1, characterized in that the brake pedal is indirectly connected to the shifting slide valve means.

3. A brake according to claim 1, characterized in that the brake pedal is directly connected to the shifting slide valve means.

4. A brake according to claim 3, characterized in that a line leading to an end face of the control slide valve means is branched off from a line between the shifting slide valve means and the engageable means, and in that the control slide valve means controls with two partial pistons both the inlet as also the outlet of the working circulation means.

5. A hydrodynamic braking arrangement for vehicles of the type having pedal actuable vehicle brakes; said arrangement comprising: relatively fixed blade wheel means and relatively rotatable blade wheel means arranged in facing relationship to one another to form a working circulation space therebetween, working fluid supply means for supplying working fluid to said working circulation to facilitate the transfer of braking forces from said fixed wheel means to said rotatable wheel means, pressure medium actuable engageable means for selectively engaging said rotatable wheel means with a drive shaft of the vehicle, and pressure medium supply means for supplying a pressure medium to actuate said engageable means in response to actuation of said pedal actuable vehicle brakes, wherein said working fluid supply means and said pressure medium supply means are interconnected with one another such that supply of the working fluid is controlled by back pressure build up in said pressure medium supply means, said back pressure build up taking place only after actuation of said engageable means, whereby supply of working fluid to said working circulation space only takes place after engagement of said engageable means.

6. An arrangement according to claim 5, wherein said working circulation space extends concentrically around said drive shaft of the vehicle, and wherein said engageable means is a clutch positioned between said drive shaft and said working circulation space.

7. An arrangement according to claim 5 wherein said working fluid supply means includes a working fluid reservoir, and a working fluid valve means movable from a first position communicating said reservoir and working circulation space such that a supply of working fluid is continuously circulated through said working circulation space to a second position communicating said reservoir and working circulation space such that the working fluid is emptied from the working circulation space.

8. An arrangement according to claim 7 wherein said working fluid supply means includes a biasing means for constantly biasing said working fluid valve means toward said second position, and wherein said pressure medium supply means communicates directly with said working fluid valve means such that back pressure in said pressure medium supply means moves said working fluid valve to said first position.

9. An arrangement according to claim 8, wherein said working circulation space extends concentrically around said drive shaft of the vehicle, and wherein said engageable means is a clutch positioned between said drive shaft and said working circulation space.

10. An arrangement according to claim 8, wherein said working fluid valve means is constructed as a shifting slide valve, wherein said biasing means is a spring engaging said shifting slide valve, and wherein said pressure medium supply means communicates directly with a piston surface on said shifting slide valve.

11. An arrangement according to claim 10, wherein said pressure medium supply means includes a shifting slide valve movable from a first position communicating a supply of pressure medium to said engageable means to a second position exhausting the pressure medium from said engageable means, and wherein said piston surface is arranged in a line between said engageable means and said shifting slide valve of the pressure medium supply means.

12. An arrangement according to claim 11, wherein said shifting valve means of said pressure medium supply means is normally biased toward the second position thereof, and wherein actuation of said brake pedal effects movement of said shifting valve means of said pressure medium toward the first position thereof.

13. An arrangement according to claim 12 wherein said working circulation space extends concentrically around said drive shaft of the vehicle, and wherein said engageable means is a clutch positioned between said drive shaft and said working circulation space.

14. An arrangement according to claim 5 wherein said pressure medium supply means includes a shifting slide valve movable from a first position communicating a supply of pressure medium to said engageable means to a second position exhausting the pressure medium from said engageable means, and wherein a control valve of the working fluid supply means is arranged in a line between said engageable means and said shifting slide valve of the pressure medium supply means.

15. An arrangement according to claim 14, wherein said shifting valve means of said pressure medium supply means is normally biased toward the second position thereof, and wherein actuation of said brake pedal effects movement of said shifting valve means of said pressure medium toward the first position thereof.

16. An arrangement according to claim 14, wherein said pressure medium supply means includes a single fluid line interconnecting said shifting slide valve of said pressure medium supply means with said engageable means, wherein both the supply and exhaust of pressure medium is by way of said single fluid line, and wherein said single fluid line communicates directly with a control surface of said control valve of said working fluid supply means.

17. An arrangement according to claim 16, wherein said single fluid line is uninterrupted along its length except for the communication with said control valve, whereby movement of said control valve is in direct response to back pressure build-up in said fluid line which occurs after actuation of said engageable means.

* * * * *